United States Patent [19]
Joyce

[11] Patent Number: 5,052,616
[45] Date of Patent: Oct. 1, 1991

[54] COIN RECEIVING INCENTIVE DEVICE
[75] Inventor: Allen E. Joyce, Mentor, Ohio
[73] Assignee: Gordon Warren Co., Wickliffe, Ohio
[21] Appl. No.: 606,526
[22] Filed: Oct. 31, 1990
[51] Int. Cl.[5] ............................................. A47F 7/00
[52] U.S. Cl. ..................................... 232/1 D; 40/657
[58] Field of Search ........................... 211/13, 87, 88; 232/1 D, 4 R; 40/122, 323, 657; 206/445

[56] References Cited
U.S. PATENT DOCUMENTS

| 857,590 | 6/1907 | Branch | 211/13 X |
|---|---|---|---|
| 1,303,299 | 5/1919 | Hahl | 211/87 X |
| 2,514,451 | 7/1950 | Krissoff | 40/657 X |
| 4,750,281 | 6/1988 | Magdovitz | 40/657 X |

Primary Examiner—Robert W. Gibson, Jr.
Attorney, Agent, or Firm—Frank B. Robb

[57] ABSTRACT

A device or article to receive and display coins received and accumulated as incentives for accomplishing various tasks which are indicated to be performed, which may be carried out on days or other preferred intervals. The article is intended to be hung or otherwise displayed as a continual reminder of the existence of the tasks and the accomplishments of the same, and so provided with a sufficient number of pockets to receive a substantial number of coins and to relate the same to a variety of tasks.

3 Claims, 1 Drawing Sheet

COIN RECEIVING INCENTIVE DEVICE

BACKGROUND OF THE DISCLOSURE

The concept of providing some kind of a device or article which is useful as a basis for an incentive program for children, is not new as suggested by the prior art including the patent of Doupnik, U.S. Pat. No. 2,863,603, of Dec. 9, 1958, which provides for receiving and temporarily storing coins for saving purposes.

Also the patent of Holmes, U.S. Pat. No. 3,035,355, May 22, 1962, shows another form of device which is intended to provide reward or incentive for performance of certains tasks.

However, these devices are relatively complex and store coins only in serial fashion, thus are not intended to make possible removal or change of position of the coins or display the same in an attractive manner.

In fact they are more intended to limit access of particular coins and are not particularly attractive from the standpoint of accumulating coins in a manner to display the same.

There are coin holders which provide more attractive display such as shown in patent of McDermut, U.S. Pat. No. 2,954,866, wherein an angular disposition of coins is provided, but only for display and not related to incentives in any way.

Other patents provide for accepting and holding coins in various positions for display, but an incentive relationship is not contemplated in those certain patents.

GENERAL DESCRIPTION OF THE INVENTION

The instant disclosure is of a device or article which provides an attractive basis for an incentive program in which coins are used as rewards for certain tasks performed at certain intervals, days may be chosen, and facilitates the storing of, and display of coins as tasks are performed to not only remind the person that the tasks are to be performed at certain intervals, but clearly displays the accomplishment by use of a coin related to task and time, in a base which includes specially formed pockets and the relationship of pockets to confirm the completion yet quickly emptied and readily discloses the status of the program.

The article or device is formed with coin receiving pockets in alignment related to the time as well as the task and is incorporated in a body or base which may be formed by the vacuum forming process whereby the contours desired for receiving the coins and also retrieving them in any chosen order, while displaying them angularly and making obvious any gaps which indicate a failure to perform a given task or at a given time.

DETAILED DESCRIPTION OF THE INVENTION

Figure 1:
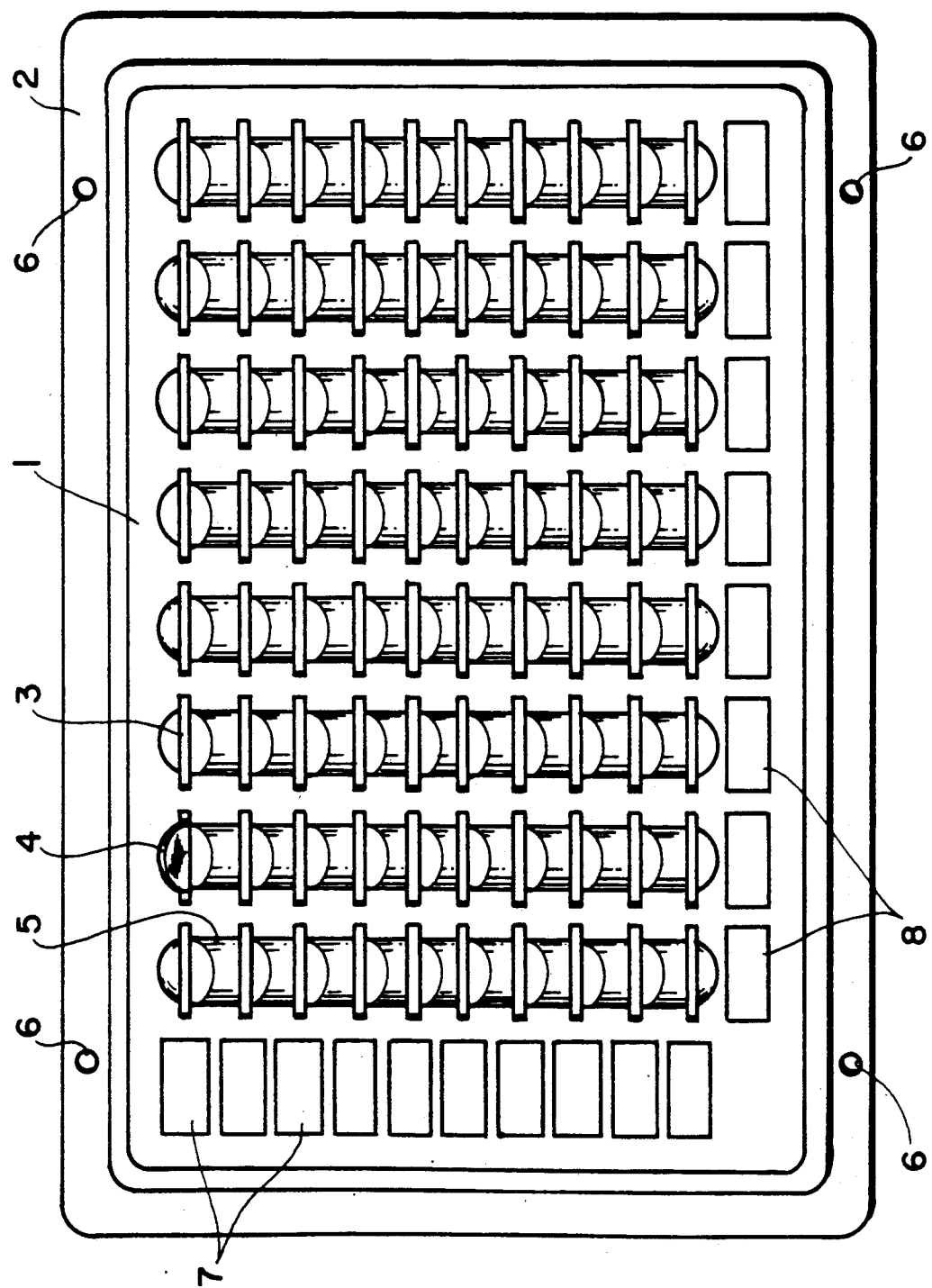

The foregoing general statement describing the invention is here illustrated in detail by reference to the drawing wherein FIG. 1 is a top plan view of the body of the device disclosing the coin receiving pockets in their relationship.

Figure 2:
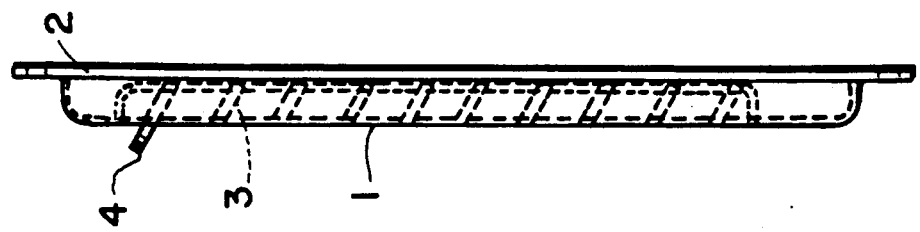

FIG. 2. is an end view of FIG. 1 to show the shape and position of the pockets in relation to the body.

Referring to FIG. 1, the body 1 of the device is seen as being rectilinar in outline with a skirt 2 which extends therearound.

Arranged in logitudinal and transverse alignment are a series of pockets 3 which are to receive coins and as such include the necessary contour to accept and maintain the coin in position.

A single coin 4 is shown in one of the pockets 3 and it will be noted that the pocket is formed so as to display the coin at an angle for ready observation of its denomination.

Connecting the transversely positioned pockets, is a depressed area 5 which assists in placing the coins in the pockets 3 an also in removing them since it enables the fingers of the user to hold the coin until the same is in proper position.

Holes 6 in the skirt 2 are provided to fasten the device to a surface, of hang the same on a wall with fasteners of appropriate form.

In order to provide for indicia related to the tasks and time for performing the same, certain transverse areas 7 related to the tasks to be performed are provided.

Longitudinally positioned areas 8 are provided to relate to the days of the week or the like, and are also disclosed, it being apparent that additional pockets can be provided and denominated in any preferred manner.

Since the entire device is intended to be formed from suitable material it is desirably made by the vacuum forming process, which will readily provided the formations which have been described and in a relatively inexpensive material and by a suitable method.

I claim:

1. An incentive creating device comprising a series of coin receiving pockets arranged to support coins angularly with respect to a surface, said pockets further being related in columns longitudinally and transversely, wherein the pockets are formed to facilitate placing coins in the pockets and removing them therefrom, certain areas of the body of the device making provision for finger gripping of the coins.

2. An incentive creating device comprising a series of coin receiving pockets arranged to support coins angularly with respect to a surface, said pockets further being related in columns longitudinally and transversely, wherein each pocket is concave to conform to the periphery of a coin, finger receiving portions being formed between the transversely arranged pockets.

3. An incentive creating device comprising a series of coin receiving pockets arranged to support coins angularly with respect to a surface, said pockets further being related in columns longitudinally and transversely, wherein the pockets are formed to extend below a planar surface upon which indicia related thereto are located.

* * * * *